(12) United States Patent
Zuo et al.

(10) Patent No.: US 12,168,968 B2
(45) Date of Patent: Dec. 17, 2024

(54) SIMULTANEOUS OCEAN WAVE AND CURRENT ENERGY HARVESTING

(71) Applicant: VIRGINIA TECH INTELLECTUAL PROPERTIES, INC., Blacksburg, VA (US)

(72) Inventors: Lei Zuo, Blacksburg, VA (US); Robert Parker, Salt Lake City, UT (US); Xiaofan Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 17/784,187

(22) PCT Filed: Jan. 13, 2021

(86) PCT No.: PCT/US2021/013208
§ 371 (c)(1),
(2) Date: Jun. 10, 2022

(87) PCT Pub. No.: WO2021/146263
PCT Pub. Date: Jul. 22, 2021

(65) Prior Publication Data
US 2023/0032172 A1    Feb. 2, 2023

Related U.S. Application Data

(60) Provisional application No. 62/960,416, filed on Jan. 13, 2020.

(51) Int. Cl.
*F03B 13/22*        (2006.01)
*F03B 13/10*        (2006.01)
(Continued)

(52) U.S. Cl.
CPC .............. *F03B 13/22* (2013.01); *F03B 13/10* (2013.01); *F03B 13/12* (2013.01); *F03B 13/16* (2013.01);
(Continued)

(58) Field of Classification Search
CPC ......... F16D 1/00; F05B 2260/40; Y02E 10/30
See application file for complete search history.

(56) References Cited

U.S. PATENT DOCUMENTS 5,106,261 A * 4/1992 Bosen .................... F03B 11/06
                                                        415/124.1
6,247,308 B1 * 6/2001 Solell .................. F03B 13/1815
                                                        74/125.5
(Continued)

FOREIGN PATENT DOCUMENTS

ES            1089231 U       9/2013

OTHER PUBLICATIONS

Boxi Jiang, Xiaofan Li, Shuo Chen, Qiuchi Xiong, Bang-fuh Chen, Robert G. Parker, Lei Zuo, "Dynamics of a hybrid wave-current energy converter with a novel power take-off mechanism," Proc. SPIE 10967, Active and Passive Smart Structures and Integrated Systems XIII, 109670U (Mar. 21, 2019) (Year: 2019).*
(Continued)

*Primary Examiner* — Loren C Edwards
(74) *Attorney, Agent, or Firm* — Thomas | Horstemeyer, LLP

(57) ABSTRACT

Various examples of simultaneous ocean wave and current energy harvesting are described, using a hybrid ocean energy converter and a mechanical transfer system therefor. In one example, a hybrid ocean energy converter includes a two-body point absorber comprising a first body and a second body. The two-body point absorber can be configured to transfer a linear relative motion between the first
(Continued)

body and the second body to bi-directional rotation of a first input shaft. A turbine can be configured rotate a second input shaft. The converter further includes a hybrid power takeoff including a mechanical transfer system configured to mechanically couple the first input shaft, the second input shaft, an output shaft, and an output shaft.

21 Claims, 9 Drawing Sheets

(51) Int. Cl.
F03B 13/12 (2006.01)
F03B 13/16 (2006.01)
F03B 13/26 (2006.01)
F16D 1/00 (2006.01)

(52) U.S. Cl.
CPC ............... *F03B 13/26* (2013.01); *F16D 1/00* (2013.01); *F05B 2260/40* (2013.01); *Y02E 10/30* (2013.01)

(56) References Cited

U.S. PATENT DOCUMENTS

| | | | |
|---|---|---|---|
| 8,253,263 B2 | 8/2012 | Atilano et al. | |
| 2006/0151664 A1 | 7/2006 | Yu et al. | |
| 2009/0121487 A1 | 5/2009 | Fraenkel | |
| 2010/0140944 A1* | 6/2010 | Gardiner | F03B 13/16 290/53 |
| 2010/0319340 A1 | 12/2010 | Wickett | |
| 2014/0322996 A1* | 10/2014 | Nakamura | F03D 13/22 416/85 |

OTHER PUBLICATIONS

International Search Report and Written Opinion for International Application No. PCT/US2021/013208 mailed Jun. 3, 2021.
Abdelkareem et al., "Vibration energy harvesting in automotive suspension system: A detailed review," Applied Energy, 2018, vol. 229, pp. 672-699.
Bayoumi et al., "Wave powered water desalination in Egypt," 14th International Water Technology Conference, Jan. 2010, pp. 191-199.
Chen et al., "The deployment of the first tidal energy capture system in Taiwan," Ocean Engineering, 2018, vol. 155, pp. 261-277.
Cheng et al., "The state of the art of wind energy conversion systems and technologies: A review," Energy Conversion and Management, 2014, vol. 88, pp. 332-347.
Drew et al., "A review of wave energy converter technology," Proceedings of the Institution of Mechanical Engineers, Jun. 2009, vol. 223, Part A, pp. 887-902.
Ekren et al., "Size optimization of a PV/wind hybrid energy conversion system with battery storage using response surface methodology," Applied Energy, 2008, vol. 85, pp. 1086-1101.
Electric Power Research Institute, "Mapping and Assessment of the United States Ocean Wave Energy Resource," Technical Report, Dec. 2011, 176 pages.
Elwood et al., "Design, construction, and ocean testing of a taut-moored dual-body wave energy converter with a linear generator power take-off," Renewable Energy, 2010, vol. 35, pp. 348-354.
Falcao, A.F., "Control of an oscillating-water-column wave power plant for maximum energy production," Applied Ocean Research, 2002, vol. 24, pp. 73-82.
Falnes, J., "Wave-Energy Conversion Through Relative Motion Between Two Single-Mode Oscillating Bodies," ASME, Feb. 1999, vol. 121, pp. 32-38.
Guo et al., "Identification and Validation of Excitation Force for a Heaving Point Absorber Wave Energy Convertor," 12th European Wave and Tidal Energy Conference, Sep. 2017, 9 pages.
Guo et al., "Numerical and experimental studies of excitation force approximation for wave energy conversion," Renewable Energy, 2018, vol. 125, pp. 877-889.
Haas et al., "Assessment of Energy Production Potential from Ocean Currents along the United States Coastline," Georgia Tech Research Corporation, Sep. 2013, 66 pages.
Henderson, R., "Design, simulation, and testing of a novel hydraulic power take-off system for the Pelamis wave energy converter," Renewable Energy, 2006, vol. 31, pp. 271-283.
Hobeck et al., "Artificial piezoelectric grass for energy harvesting from turbulence-induced vibration," Smart Materials and Structures, 2012, vol. 21, pp. 1-11.
Lawson et al., "Development and Verification of a Computational Fluid Dynamics Model of a Horizontal-Axis Tidal Current Turbine," Proceedings of the ASME 2011 30th International Conference on Ocean, Offshore and Arctic Engineering, Jun. 19-24, 2011, 10 pages.
Li et al., "A synthesis of numerical methods for modeling wave energy converter-point absorbers," Renewable and Sustainable Energy Reviews, 2012, vol. 16, pp. 4352-4364.
Li et al., "Design and Simulation of a Novel Mechanical Power Take-Off for a Two-Body Wave Energy Point Absorber," International Design Engineering Technical Conferences & Computers and Information in Engineering Conference, Jul. 17-20, 2006, 10 pages.
Liang et al., "Design, fabrication, simulation and testing of an ocean wave energy converter with mechanical motion rectifier," Ocean Engineering, Mar. 2017, vol. 136, pp. 190-200.
Liang et al., "On the dynamics and design of a two-body wave energy converter," Renewable Energy, 2017, vol. 101, pp. 265-274.
Lin et al., "Modeling and field testing of an electromagnetic energy harvester for rail tracks with anchorless mounting," Applied Energy, 2018, vol. 213, pp. 219-226.
Martin et al., "Numerical analysis and wave tank validation on the optimal design of a two-body wave energy converter," Renewable Energy, 2020, vol. 145, pp. 632-641.
Martin, H., "Development of a Scale Model Wind Turbine for Testing of Offshore Floating Wind Turbine Systems," Thesis, The University of Maine, Dec. 2011, 181 pages.
Myers et al., "Simulated electrical power potential harnessed by marine current turbine arrays in the Alderney Race," Renewable Energy, 2005, vol. 30, pp. 1713-1731.
Patel et al., "Performance enhancement of a Darrieus hydrokinetic turbine with the blocking of a specific flow region for optimum use of hydropower," Renewable Energy, 2019, vol. 135, pp. 1144-1156.
Patel et al., "Theoretical study on the prediction of the hydrodynamic performance of a Savonius turbine based on stagnation pressure and impulse momentum principle," Energy Conversion and Management, 2018, vol. 168, pp. 545-563.
Patel et al., "Velocity and performance correction methodology for hydrokinetic turbines experimented with different geometry of the channel," Renewable Energy, 2019, vol. 131, pp. 1300-1317.
Perez-Collazo et al., "Hydrodynamic response of the WEC subsystem of a novel hybrid wind-wave energy converter," Energy Conversion and Management, 2018, vol. 171, pp. 307-325.
Shirazi et al., "Solar-powered absorption chillers: A comprehensive and critical review," Energy Conversion and Management, 2018, vol. 171, pp. 59-81.
Thorpe T.W., "A Brief Review of Wave Energy," UK Department of Trade and Industry, May 1999, 151 pages.
U.S. Department of Energy, "Wave Energy Prize Rules," Wave Energy Prize, 2016, 59 pages.
Wen et al., "Blade loading performance of a floating wind turbine in wave basin model tests," Ocean Engineering, 2020, vol. 199, Article No. 107061, 12 pages.
Wen et al., "Influences of surge motion on the power and thrust characteristics of an offshore floating wind turbine," Energy, 2017, vol. 141, pp. 2054-2068.
Wen et al., "Monitoring blade loads for a floating wind turbine in wave basin model tests using Fiber Bragg Grating sensors: A feasibility study," Marine Structures, 2020, vol. 71, Article No. 102729, 15 pages.

(56) References Cited

OTHER PUBLICATIONS

Wen et al., "The power performance of an offshore floating wind turbine in platform pitching motion," Energy, 2018, vol. 154, pp. 508-521.
Whittaker et al., "The development of Oyster—A shallow water surging wave energy converter," 7th European Wave and Tidal Energy Conference, Jan. 2007, 7 pages.
Wußow et al., "3D-simulation of the turbulent wake behind a wind turbine," Journal of Physics: Conference Series, 2007, vol. 75, Article No. 012033, 9 pages.
Zhao, D., "Waste thermal energy harvesting from a convection-driven Rijke-Zhao thermo-acoustic-piezo system," Energy Conversion and Management, 2013 vol. 66, pp. 87-97.
Zodiatis et al., "Wave energy potential in the Eastern Mediterranean Levantine Basin. An integrated 10-year study," Renewable Energy, 2014, vol. 69, pp. 311-323.
Chen, Chien-An, et al., "Equivalent Circuit for Mechanical-Motion-Rectifier-Based Power Take-off in Wave Energy Harvesting," Presented at the 4th Asian Wave and Tidal Energy Conference (2018), Taipei (5 pages).
Pan, Yu, et al., "A compact ball screw based electromagnetic energy harvester for railroad application," Proceedings of SPIE, SPIE Smart Structures and Materials + Nondestructive Evaluation and Health Monitoring (2018), Denver, Colorado (17 pages).
Falnes, Johannes, "Ocean Waves and Oscillating Systems—Linear Interactions Including Wave-Energy Extraction," Cambridge University Press (2002) (9 pages).
Hasselmann, K., et al. Measurements of Wind-Wave Growth and Swell Decay during the Joint North Sea Wave Project (JONSWAP), Deutsches Hydrographisches Institut—Hamberg (1973) (94 pages).
Chiu, Forng-Chen, et al., "Development of Floating Kuroshio Turbine Equipped with Foil Float—Deployment and Recovery Simulation," Presented at Oceans 2016, Shanghai (5 pages).
Jiang, Boxi, et al., "Dynamics of a hybrid wave-current energy converter with a novel power take-off mechanism," Proceedings of SPIE Smart Structures + Nondestructive Evaluation (2019), Denver, Colorado (14 pages).
Patel, Vimal, et al., "Experimental investigations on Darrieus straight blade turbine for tidal current application and parametric optimization for hydro farm arrangement," International Journal of Marine Energy, vol. 17 (2017), pp. 110-135.
Patel, Vimal, et al., "Influence of overlap ratio and aspect ratio on the performance of Savonius hydrokinetic turbine," International Journal of Energy Research, vol. 41 (2017), pp. 829-844.

\* cited by examiner

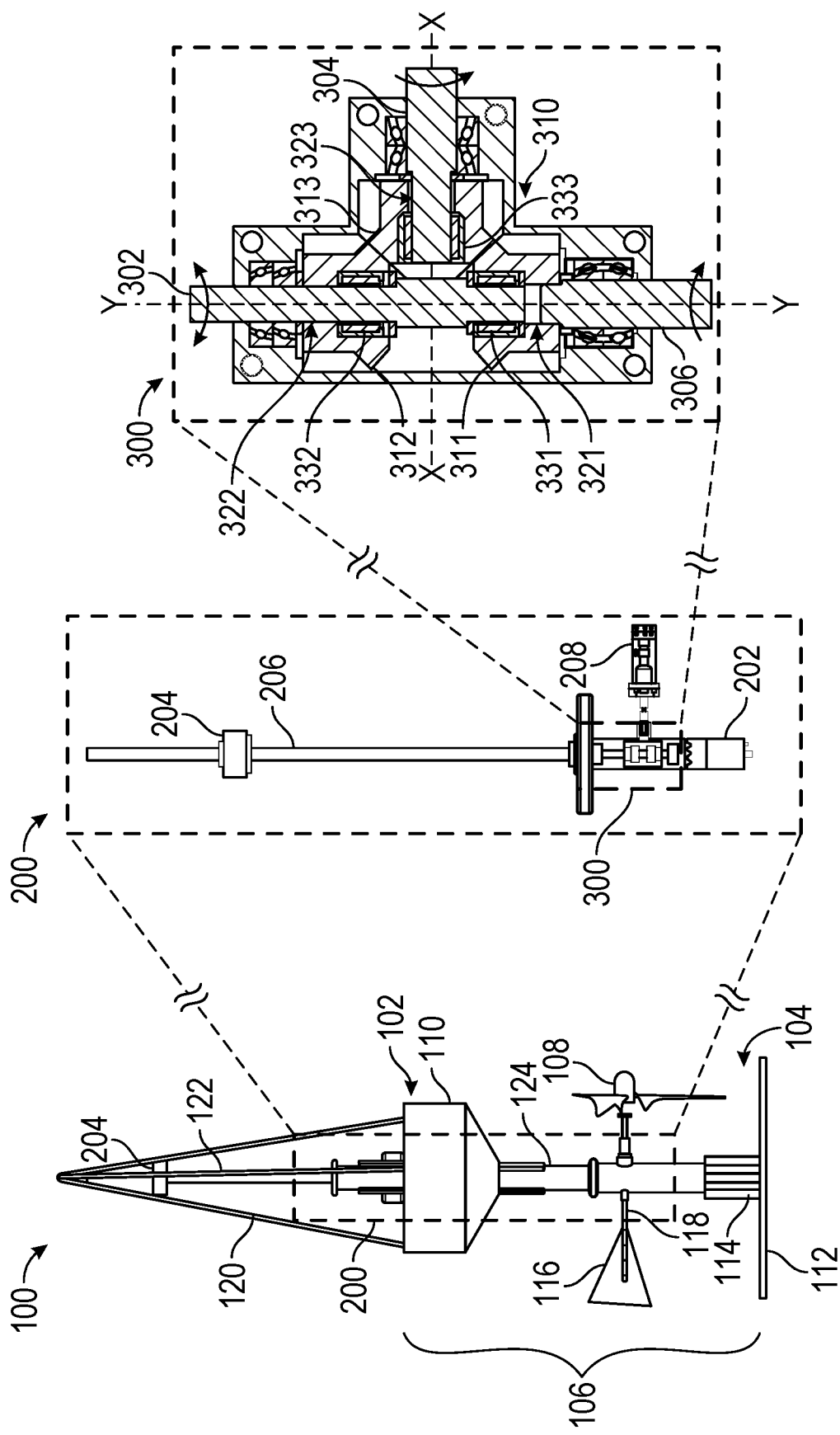

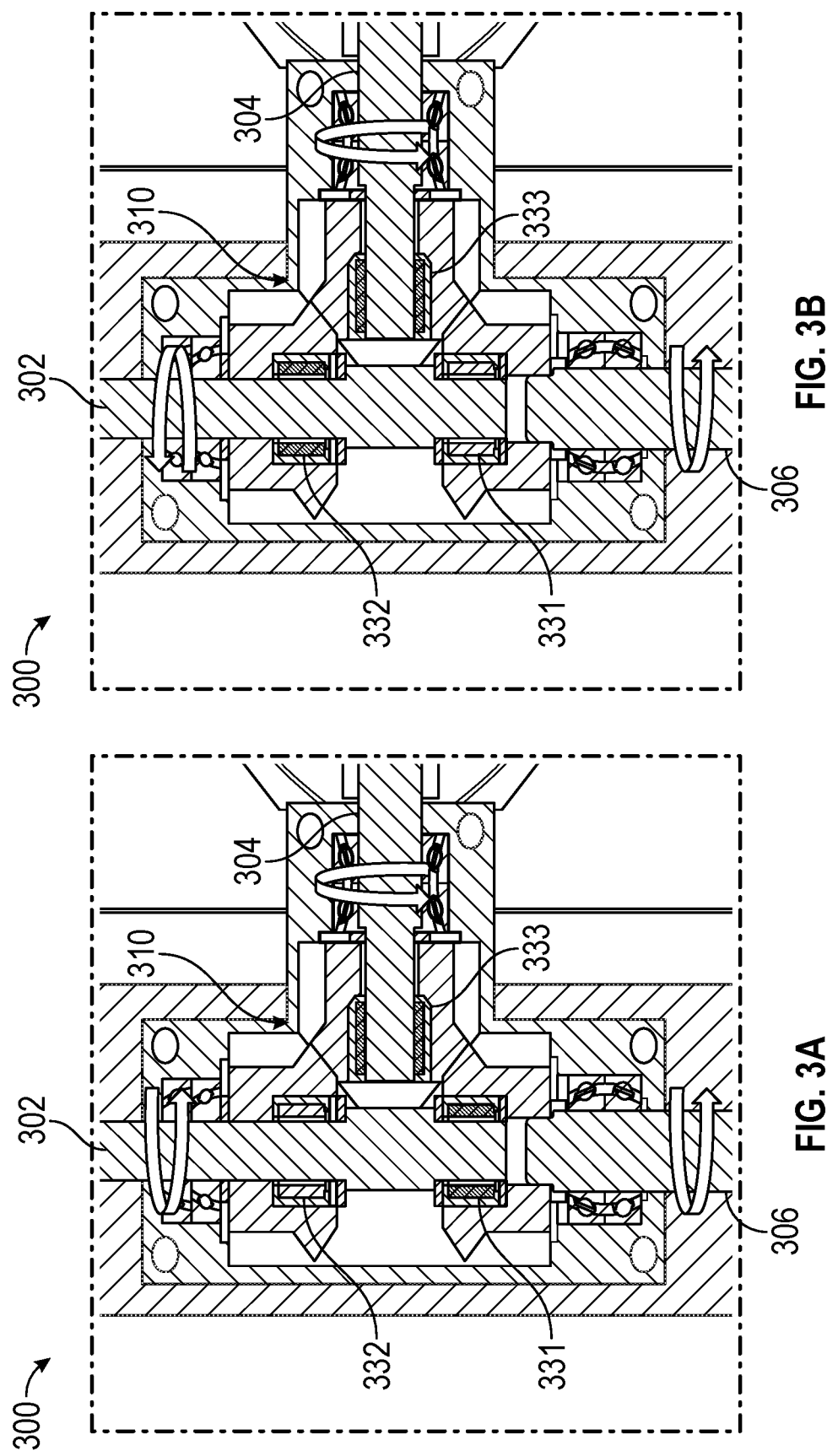

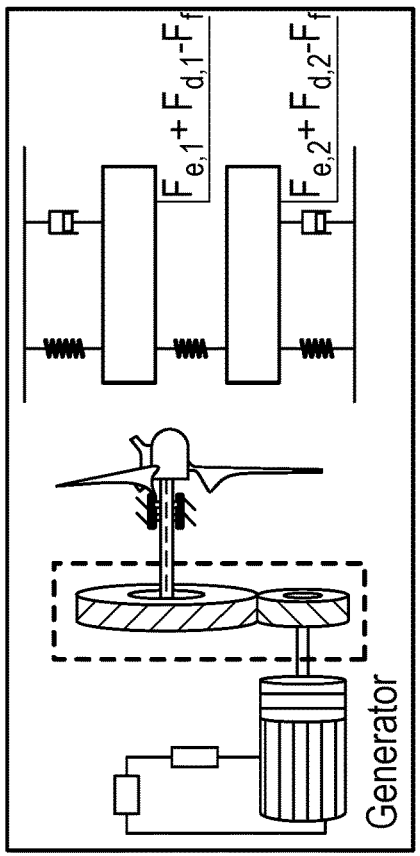
FIG. 4A
FIG. 4B
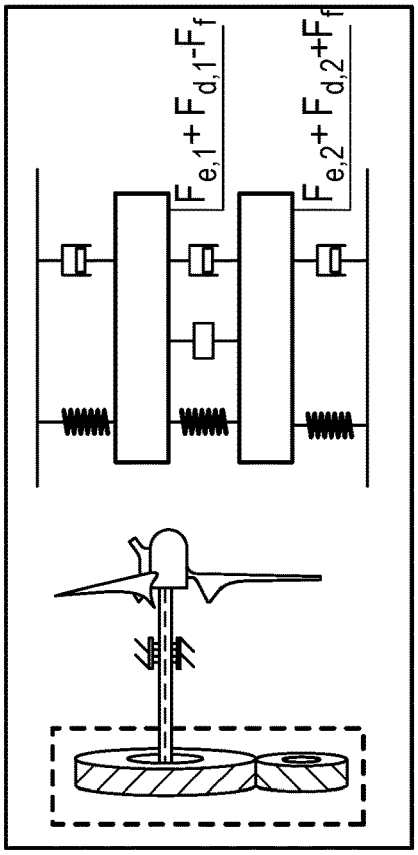
FIG. 4C
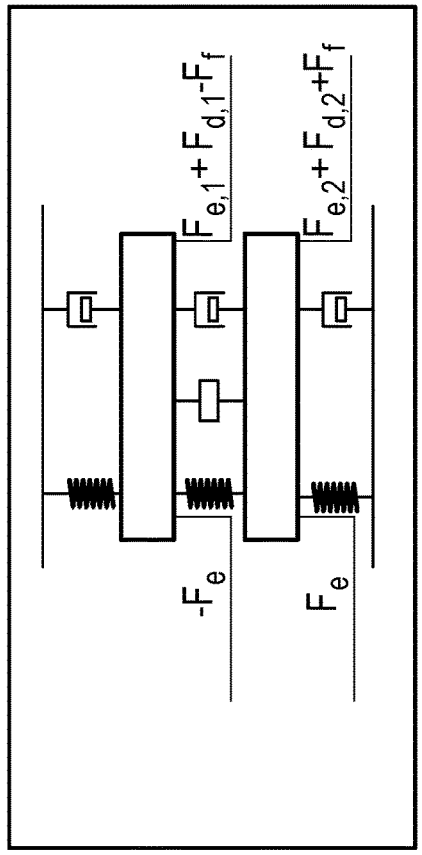
FIG. 4D

SIMULTANEOUS OCEAN WAVE AND CURRENT ENERGY HARVESTING

CROSS-REFERENCE TO RELATED APPLICATIONS

This application is a 35 U.S.C. § 371 national stage application of PCT Application No. PCT/US2021/013208, titled "SIMULTANEOUS OCEAN WAVE AND CURRENT ENERGY HARVESTING," filed Jan. 13, 2021, which claims the benefit of and priority to U.S. Provisional Application No. 62/960,416, titled "SIMULTANEOUS OCEAN WAVE AND CURRENT ENERGY HARVESTING USING A SINGLE POWER TAKEOFF," filed on Jan. 13, 2020, the entire contents of both of which applications are hereby incorporated herein by reference.

STATEMENT REGARDING FEDERALLY SPONSORED RESEARCH

This invention was made with government support under award DE-EE0007174 awarded by the Department of Energy. The government has certain rights in the invention.

BACKGROUND

Harvesting energy from renewable environmental resources is an attractive solution to serve growing energy demand. Research has been devoted to harvesting renewable energy in various forms, including solar energy and wind energy. In addition to these sources, marine and hydrokinetic (MHK) energy, including ocean waves, tidal current, ocean current, and river current have been recognized as a promising power source due to the full-day availability, high energy potential and high power density of these sources. The MHK resources largely co-exist in the same sites.

SUMMARY

A hybrid energy converter is described. In one example, the hybrid energy converter can include a wave energy converter configured to convert an oscillatory motion of waves to a bi-directional rotation of a first input shaft, a turbine configured to turn a second input shaft, and a hybrid power takeoff. The hybrid power takeoff can include a mechanical transfer system configured to mechanically couple the first input shaft, the second input shaft, an output shaft, and a generator, the generator being coupled to the output shaft. In some aspects, the output shaft is mechanically secured in a first axial channel of the hybrid power takeoff, and the output shaft rotates in one direction.

The mechanical transfer system can include a motion coupling device. The motion coupling device can include at least one motion transmission component and at least one one-way clutch, the one-way clutch positioned to engage the motion coupling device and transfer torque to the output shaft from at least one of the first input shaft and the second input shaft. In some cases, the motion transmission component can include at least one of: a bevel gear, a spur gear, a belt, or a chain.

In additional aspects, the at least one one-way clutch can include three one-way clutches. In some cases, a first clutch among the three one-way clutches can be configured to engage the first input shaft for clockwise rotation of the first input shaft and to release the first input shaft for counterclockwise rotation of the first input shaft, a second clutch among the three one-way clutches can be configured to release the first input shaft for clockwise rotation of the first input shaft and to engage the first input shaft for counterclockwise rotation of the first input shaft, and a third clutch among the three one-way clutches can be configured to engage the second input shaft for clockwise rotation of the second input shaft and to release the second input shaft for counterclockwise rotation of the second input shaft. In other cases, a first clutch among the three one-way clutches can be configured to engage the first input shaft for counterclockwise rotation of the first input shaft and to release the first input shaft for clockwise rotation of the first input shaft, a second clutch among the three one-way clutches can be configured to release the first input shaft for counterclockwise rotation of the first input shaft and to engage the first input shaft for clockwise rotation of the first input shaft, and a third clutch among the three one-way clutches can be configured to engage the second input shaft for counterclockwise rotation of the second input shaft and to release the second input shaft for clockwise rotation of the second input shaft.

In additional aspects, the one-way clutch can be configured to engage when an angular velocity of the output shaft is less than a rotational velocity at least one of the first input shaft and the second input shaft. In some cases, the output shaft can be driven by the first input shaft when an angular velocity of the first input shaft is greater than an angular velocity of the second input shaft and the output shaft. In some cases, the output shaft can be driven by the second input shaft when the angular velocity of the second input shaft is greater than the angular velocity of the first input shaft and the output shaft. In some cases, the output shaft can be driven by both the first input shaft and the second input shaft when the angular velocity of the first input shaft is equal to the angular velocity of the second input shaft and greater than the angular velocity of the output shaft. In other aspects, in response to an angular acceleration of the first input shaft being greater than an angular acceleration of the second input shaft or the output shaft, the first input shaft can be engaged to drive the output shaft. In still other aspects, in response to an angular acceleration of the second input shaft being greater than an angular acceleration of the first input shaft or the output shaft, the second input shaft is engaged to drive the output shaft.

In another example, a hybrid ocean energy converter can include a two-body point absorber comprising a first body and a second body, a turbine configured to turn a second input shaft, and a hybrid power takeoff comprising a mechanical transfer system configured to mechanically couple the first input shaft, the second input shaft, an output shaft, and a generator coupled to the output shaft. The two-body point absorber can be configured to transfer a linear relative motion between the first body and the second body to bi-directional rotation of a first input shaft. The mechanical transfer system can include a bevel gear set, the bevel gear set comprising three bevel gears and three one-way clutches, the one-way clutches being positioned to engage the bevel gear set to transfer torque to the output shaft from at least one of the first input shaft and the second input shaft.

In some cases, the first body floats on a surface of a body of water, the second body submerges in water, and the first body and the second body translate relative to each other in response to oscillating wave motion. In some cases, the hybrid ocean energy converter can also include a turbine gearbox connected between a turbine shaft and the second input shaft. The turbine gearbox can include a planetary gear system configured to convert a first rotational velocity of the turbine shaft to a second rotational velocity of the second input shaft. In additional aspects, the first body can include a floating buoy, the second body can include a submerged plate, and the hybrid power takeoff further include a ball screw nut and a ball screw. The floating buoy can be connected to the ball screw nut. The ball screw can be connected to the submerged plate. The ball screw nut can be configured to translate along the ball screw shaft to rotate the ball screw shaft, where the ball screw shaft connected to the first input shaft.

In another example, a mechanical transfer system can include a first bevel gear comprising a first clutch and a first axial channel extending along a first axis through the first bevel gear, a second bevel gear comprising a second clutch and a second axial channel extending through the second bevel gear along the first axis, a third bevel gear mechanically interfacing between the first bevel gear and the second bevel gear and comprising a third clutch and a third axial channel extending through the third bevel gear along a second axis, the second axis extending perpendicular to the first axis. An output shaft can extend along the first axis and can be mechanically secured in the first axial channel, a first input shaft can extend along the first axis, through the second axial channel, through the second clutch, at least in part into the first axial channel, and into the first clutch, and a second input shaft can extend along the second axis, through the third axial channel and into the third clutch. The first clutch can be configured to engage the first input shaft for clockwise rotation of the first input shaft and to release the first input shaft for counterclockwise rotation of the first input shaft, the second clutch can be configured to release the first input shaft for clockwise rotation of the first input shaft and to engage the first input shaft for counterclockwise rotation of the first input shaft, and the third clutch can be configured to engage the second input shaft for clockwise rotation of the second input shaft and to release the second input shaft for counterclockwise rotation of the second input shaft. In some aspects, when the clutches are not engaged, the output shaft rotates independently. In still other aspects, the first input shaft can be driven by a two-body point absorber, a ball screw nut system, a pulley system, a chain system, or a rack and pinion system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 1A illustrates an example of a hybrid wave current energy converter (HWCEC) system according to various embodiments described herein.

FIG. 1B illustrates an example of a power takeoff (PTO) system of the hybrid wave current energy converter of FIG. 1A according to various embodiments described herein.

FIG. 1C illustrates an example of a hybrid PTO gearbox of the hybrid wave current energy converter of FIG. 1A according to various embodiments described herein.

FIGS. 3A and 3B illustrate examples of coexisting input from the bi-directional motion of the wave-input shaft and the current-input shaft of the hybrid PTO gearbox of FIG. 1C according to various embodiments described herein.

FIGS. 4A-4D illustrate models of four different working modes according to various embodiments described herein.

DETAILED DESCRIPTION

Figure 2C:
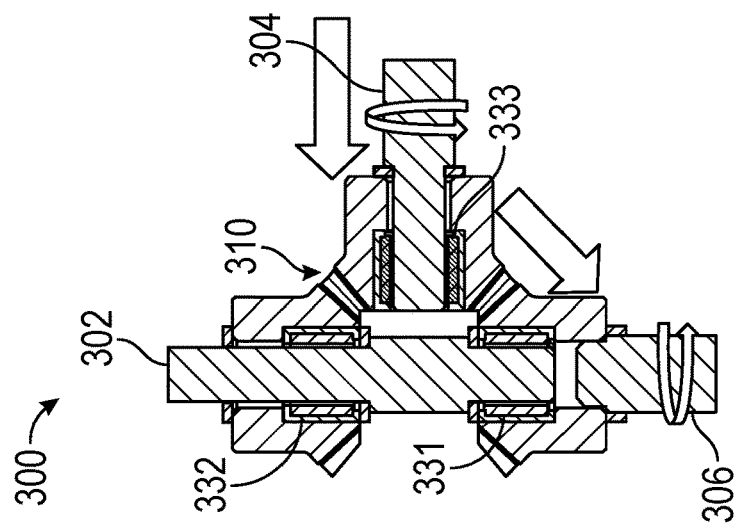
FIG. 2C illustrates an example of converting rotational motion of the current-input shaft of the hybrid PTO gearbox of FIG. 1C according to various embodiments described herein.

The present disclosure is directed towards hybrid ocean wave current energy converter (HWCEC) systems and hybrid power takeoff systems. As noted above, marine and hydrokinetic (MHK) energy, including ocean waves, tidal current, ocean current, and river current have been recognized as promising power sources due to the full-day availability and high energy potential of those sources. Due to the high density of water, MHK has much higher power flux when compared to other renewable sources. As examples, the power density of ocean wave energy is typically in the range of 10-100 KW/m, and the power density of current is in the range of 4-32 KW/m$^2$ at 2-4 m/s of water speed. The wave energy and current energy resources largely co-exists in many sites.

MHK energy harvesting heavily depends on the type of power takeoff (PTO) systems that convert water motion into electricity. However, existing ocean energy converters can convert only one of ocean wave, tidal stream, or marine current energy, which fails to fully exploit the potential when more than one energy source is available. For example, the U.S. west coast and Mediterranean regions are rich in both wave and current energy. In such regions, traditional devices that harvest from a single form of MHK energy cannot make full use of the coexisting ocean wave and current energy.

The existing converters have relatively low efficiency because of slow marine current and reciprocating wave motion speeds. As such, the focus of MHK energy harvesting devices has been harvesting either ocean wave energy or current energy, but not both. Further, MHK energy harvesting devices need to advance to be cost-effective and competitive with other energy sources. Ocean wave excitation is irregular, which means that ocean wave height and wave periods are unpredictable and excitation forces on energy harvesting devices can have large variances in amplitude and frequency. Wave energy power thus normally has a large peak-to-average ratio without active control in normal operations. Mechanical components of a wave energy converter (WEC) should preferably have a high safety factor to survive peak force situations while the electricity produced is based on the average power. Thus, the large peak to average ratio leads to high levelized cost of electricity. Also, the variability in ocean wave excitation creates difficulty for traditional energy harvesting devices that count on single energy sources to meet power supply requirements when the energy potential of one form of MHK is relatively low.

In this context, the HWCEC described herein is designed to harvest energy simultaneously from ocean waves and ocean or tidal current, to overcome the deficiencies of prior systems. The HWCEC comprises a WEC device and a tidal device coupled to independently or simultaneously drive the same generator to produce electricity. In one example, the HWCEC comprises a floating surface first body, a submerged second body, a hydro turbine parallel to the ocean current, a motion rectification mechanism for converting the oscillating ocean wave motion into a unidirectional motion, and a mechanism to couple the marine turbine rotation to drive the same generator to produce electricity. Although the WEC is described as a two-body point absorber in some examples below, other WEC devices can be relied upon for harvesting wave energy of the ocean to drive the bi-directional rotation of a wave-input shaft for the HWCEC. For example, other WEC devices can include attenuators, point absorbers, oscillating wave surge converters, oscillating water column structures, overtopping devices, submerged pressure differential devices, bulge wave devices, rotating masses, and the like. Similarly, although a horizontal axis turbine is described in some examples, other devices for harvesting ocean current can be relied upon to drive the rotation of a current-input shaft of the HWCEC.

The HWCEC systems described herein can be used for converting the energy from the ocean waves, tidal streams, and marine currents into electricity with high efficiency and low cost. The systems can efficiently harvest energy from these sources and rectify the motions to drive one generator. It may be used for generating electricity, providing electricity for utility usage, for ocean equipment, instrumentation, sensors, and for other purposes.

The HWCEC systems are hybrid energy converters that simultaneously harvest ocean waves, tidal streams, marine currents into electricity using a single device with high efficiency and low cost. The hybrid PTO described herein is developed based on a mechanical motion rectifier (MMR) based power takeoff that converts the oscillating wave motions into unidirectional rotation and a synergic integration of motion transmission. It allows marine and tidal turbine to simultaneously drive the same generator to produce electricity. In one example, the HWCEC comprises a floating surface body, a submerged second body, a hydro turbine parallel to the ocean current, a motion rectification mechanism for converting the oscillating ocean wave motion into a unidirectional motion, and a mechanism to couple the marine turbine rotation to drive the same generator to produce electricity.

The HWCEC systems can also combine the energy harvesting of ocean wave and ocean current together. The function of harvesting ocean wave is fulfilled through a self-react wave energy point absorber design and a marine current turbine harnesses the ocean current. The hybrid PTO gearbox can use both the bi-directional rotational input driven by the motion of the waves and unidirectional rotational input driven by the flow of the current, separately or together, to power the generator to output usable electricity.

In the context described above, various examples of hybrid ocean wave-current energy converters and hybrid power takeoff systems are disclosed herein. In an example, the HWCEC takes advantage of an integrated two-body point absorber type WEC to convert wave energy and a horizontal-axis turbine to convert current energy into electricity using a single device. An MMR based PTO can be configured to rectify bi-directional heave motion of two-body point absorber in the waves into unidirectional rotary motion. The hybrid PTO can integrate mechanical power from both wave and current sources to drive a single generator. Although the hybrid PTO system described herein is provided with examples in relation to harvesting ocean energy, the hybrid PTO system and hybrid energy converter concept can be relied upon for other types of energy harvesting structures based on the environmental conditions, for example Darrieus vertical axis turbines. Additionally, other means of providing mechanical rotation to the input shafts can be implemented using the hybrid PTO gearbox, as will be described in further detail.

Described below are various embodiments of the present systems and methods for hybrid ocean wave-current energy converters and hybrid power takeoff systems therefor. Although particular embodiments are described, those embodiments are mere exemplary implementations of the system and method. One skilled in the art will recognize other embodiments are possible. All such embodiments are intended to fall within the scope of this disclosure. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

In the following discussion, a general description of the systems of the present disclosure and their components is provided, followed by a discussion of the operation of the same. Non-limiting examples of hybrid ocean wave-current energy converters and hybrid PTO systems are discussed. Innovatively, the PTO system of the HWCEC can receive rotational input from the transfer of the both wave and current energy With reference to FIGS. 1A-1C, shown is an example of an HWCEC system converter 100. The HWCEC system converter 100 is illustrated as a representative example in FIGS. 1A-1C, to convey the concepts of simultaneous ocean wave and current energy harvesting according to the embodiments. The HWCEC system converter 100 can include one or more components that are not illustrated in FIGS. 1A-1C. Alternatively, one or more components shown in FIGS. 1A-1C can be omitted in some cases. Additionally, the relative sizes and shapes of one or more of the components shown can vary as compared to that shown.

As illustrated in FIG. 1A, the overall HWCEC system 100 includes a first body 102 and a second body 104, a turbine 108, and a hybrid PTO system 200. The HWCEC system 100 can be installed under water, at least in part. The HWCEC system 100 is designed to transfer mechanical (e.g., motive or kinetic) energy input from both waves and water currents to an electric generator. Wave energy can be extracted through relative heave motion between the first body 102, which can be floating on the surface of water, and the second body 104, which can be submerged in the water. The energy can be transferred though an integrated two-body point absorber type WEC 106, comprising the first body 102 and second body 104 of the hybrid PTO system 200, as described in further detail below. Current energy can be extracted by turning the turbine 108, which can be directed into the ocean current to transfer torque to the hybrid PTO system 200.

In one example, the first body 102 can be embodied as a buoy 110, and the second body 104 can be embodied as a submerged plate 112 and an attached cylinder 114. Wave energy is extracted through relative heave motion between the first body 102 and the second body 104. With the buoy 110 floating on the surface of ocean waves and the plate 112 together with the cylinder 114 secured in place, the linear relative motion between the two bodies 102, 104 can power an electric generator 202 (FIG. 1B) and extract energy from the ocean wave. The mass ratio between the buoy 110 and the second body 104 can be optimized so that the natural frequency of the system matches that of the excitation wave for better energy harvesting performance. Meanwhile, the turbine 108 of the HWCEC system 100 can also harness the ocean current to power electricity. A rudder 116 installed at the end of the turbine shaft 118 can adaptively direct the turbine 108 towards the current.

Turning to FIG. 1B, a mechanical PTO 200 couples and combines inputs from both ocean wave and ocean current energy. In this example, the buoy 102 is connected to the ball screw nut 204 through a tripod truss 120 and a push-pull tube 122. The ball screw 206, generator 202, and other parts of the PTO 200 are mounted to and housed inside the cylindrical column 124, which is fixed to the submerged plate 112 as shown in FIGS. 1A and 1B. The ball screw 206 connects to the first input shaft 302, also referred to as wave-input shaft herein, of the hybrid PTO gearbox 300 shown in FIG. 1C.

Under ocean wave excitation, the buoy 110 and the submerged plate 112 have different responses in heave motion. The relative motion of the two bodies 102, 104 drives the push-pull tube 122 and the ball nut 204 to move up and down along the ball screw 206. In this way, linear relative motion between the buoy 110 and submerged body 112 can be transferred into bi-directional rotation of the ball screw 206 and the first input shaft 302 of the hybrid PTO gearbox 300. This bi-directional rotation of a first input shaft 302 can be converted to unidirectional rotation of the output shaft 306 connected to the generator 202.

FIG. 1B also illustrates the turbine gearbox 208 of the turbine 108. The ocean current can turn the turbine 108, and the rotational motion can be transferred to the second input shaft 304, also referred to as the current-input shaft herein, of the hybrid PTO gearbox 300. The turbine 108 can turn the second input shaft 304 at the same rate as the turbine shaft 118 or be converted to another rate via a planetary gear system (not shown) within the turbine gearbox 208.

As shown in FIG. 1C, the PTO gearbox 300 acts as a mechanical transfer system. The PTO gearbox 300 includes a bevel gear set 310 configured to receive a first input shaft 302, a second input shaft 304, and an output shaft 306. In this example, the bevel gear set 310 includes three bevel gears 311-313, each having axial channels 321-323, and three one-way clutches 331-333. The first input shaft 302 can extend along a first axis Y-Y, through the second axial channel 322, through the second clutch 332, at least in part into the first axial channel 321, and into the first clutch 331. The second input shaft 304 can extend along a second axis X-X, through the third axial channel 323 and into the third clutch 333. The output shaft 306 can extend along the first axis Y-Y and can be mechanically secured in the first axial channel 321.

The three one-way clutches 331-333, each of which only allows torque to transfer in one direction, are set between the three bevel gears 311-313 and the shafts 302, 304 in the hybrid PTO gearbox 300. The three bevel gears 311-313 can be identical in dimension and tooth number to transfer torque without changing the rotational speed. A second input shaft 304 can be driven by the turbine 108. The ocean current can trigger the turbine 108 to rotate. The reciprocate rotation motion of the ball screw 206 and the unidirectional rotation motion of the turbine 108 can be combined into unidirectional rotation of an output shaft 306, through the hybrid PTO gearbox 300. The motion of the two input shafts 302, 304 can be rectified and/or unified to power the electric generator 202.

The point absorber WEC 106 shown in FIGS. 1A-1C is only one example of a WEC device for the HWCEC 100. While the first input shaft 302 in this example is driven by a ball screw nut 204 and ball screw 206, the relative linear motion can be transferred to rotational motion in other embodiments by other mechanical systems, such as rack pinion, belts, chains, and the like. Further, in other embodiments, other WEC devices can be used to harvest wave energy, such as attenuators, oscillating wave surge converters, oscillating water column structures, overtopping devices, submerged pressure differential devices, bulge wave devices, rotating masses, and the like. In some hinged types of WEC devices, such as attenuators and oscillating wave surge converters, there is no need to translate a linear motion into rotation, since the hinge can directly drive the first (wave) input shaft 302.

Figure 2B:
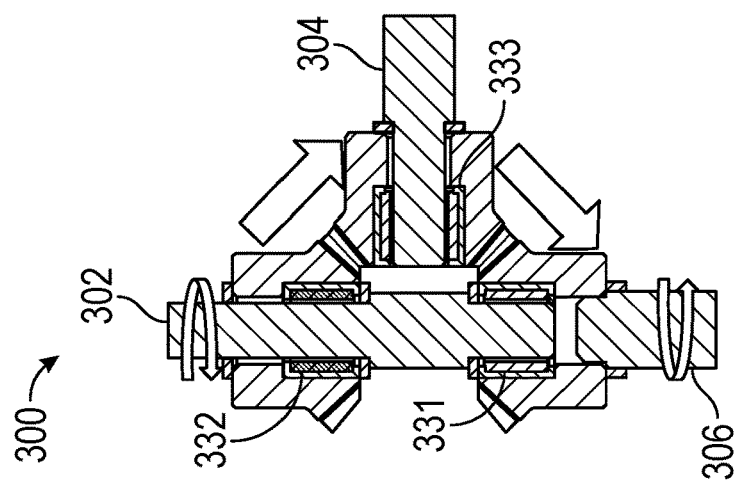
FIG. 2B illustrates another example of converting bi-directional motion of the wave-input shaft of the hybrid PTO gearbox of FIG. 1C according to various embodiments described herein.
Figure 2A:
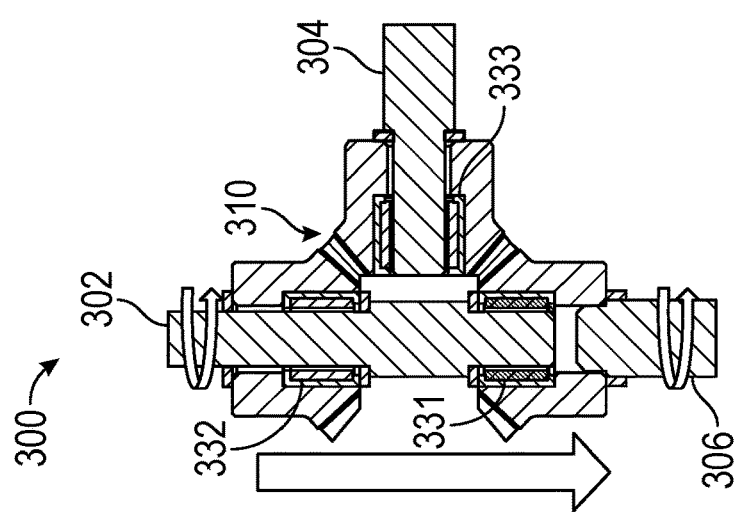
FIG. 2A illustrates an example of converting bi-directional motion of the wave-input shaft of the hybrid PTO gearbox of FIG. 1C according to various embodiments described herein.

The operation of the hybrid PTO gearbox 300 is shown in greater detail in FIGS. 2A-2C. In this example, the bevel gear set 310 includes three bevel gears 311-313, each having axial channels 321-323, and three one-way clutches 331-333. The hybrid PTO gearbox 300 acts as a mechanical transfer system to receive rotational motion from the first input shaft 302 and/or the second input shaft 304 and transfer the torque to the output shaft 306 mechanically secured to bevel gear 311 of the bevel gear set 310. The one-way clutches 331-333 engage based on the rotation of the first input shaft and/or second input shaft, only allowing torque to transfer in one direction. In this example, the first one-way clutch 331 (lower) can have counterclockwise working conditions. As such, the first clutch 331 engages (i.e., mechanically catches or interfaces) and transfers torque when the wave-input shaft 302 rotates counterclockwise (FIG. 2A) and disengages when the wave-input shaft 302 rotates clockwise (FIG. 2B). The second one-way clutch 332 (upper) can have clockwise working conditions. As such, the second one-way clutch 332 engages and transfers torque when the wave-input shaft 302 rotates clockwise (FIG. 2B) and disengages when the wave-input shaft 302 rotates counterclockwise (FIG. 2A). This configuration results in a unidirectional rotation of the output shaft 306, which is shown as counterclockwise in this example. As shown in FIG. 2C, the turbine 108 can also engage to rotate the second input shaft 304, and transfers torque to the bevel gear set 310 through the engagement of the third one-way clutch 333 (right). The turbine 108 can provide unidirectional rotation to the second input shaft 304 of the hybrid PTO gearbox 300 to rotate the output shaft 306.

As can be understood, alternate configurations providing opposite working conditions for the first and second clutches 331, 332 can also apply when a clockwise output is required for a generator 202. Where the rotational direction is described as clockwise and counterclockwise, the direction for each component can be reverse and the system will still be operational. For example, the first one-way clutch 331 can have clockwise working conditions. As such, the first clutch 331 can engage and transfer torque when the wave-input shaft 302 rotates clockwise and disengage when the wave-input shaft 302 rotates counterclockwise. The second one-way clutch 332 can have counterclockwise working conditions. As such, the second one-way clutch 332 can engage and transfer torque when the wave-input shaft 302 rotates counterclockwise and disengage when the wave-input shaft 302 rotates clockwise. This can result in a clockwise rotation of the output shaft 306.

In FIGS. 2A-2C, the arrows indicate the flow of mechanical forces and power from the first input shaft 302 or the second input shaft 304 to the output shaft 306 based on rotation. When the first input shaft 302 rotates counterclockwise, as shown in FIG. 2A, it directly transfers torque to the first one-way clutch 331 (lower) and then the output shaft 306 directly. In this case, the second one-way clutch 332 (upper) will be disengaged. As shown in FIG. 2B, when the first input shaft 302 rotates clockwise, the first input shaft 302 first transfers torque to the bevel gear set 310 through engagement of the second one-way clutch 332 (upper) and then to the output shaft 306 while the first one-way clutch 331 (lower) is disengaged. In both cases, the output shaft 306 rotates in one direction regardless of which direction the first input shaft 302 rotates.

As shown in FIG. 2C, when the HWCEC system 100 experiences only current excitation, the turbine 108 rotates unidirectionally, turning the second input shaft 304. The second input shaft 304 transfers torque to the bevel gear set 310 through the engagement of the third one-way clutch 333 (right). The bevel gear set 310 engages the first one-way clutch 331 (lower) and drives the generator 202. In such a case, the second one-way clutch 332 (upper) can be disengaged such that the turbine 108 does not drive the wave-input shaft 302. The turbine 108 connects to the second input shaft 304 of hybrid PTO gearbox 300. In some embodiments, an additional turbine gearbox 208 can be applied between the turbine shaft 118 and the second input shaft 304 to compensate for the difference between the relatively low rotation speed of the turbine 108 and the higher nominal speed of the generator 202.

Although the hybrid PTO gearbox 300 is described herein in the context of the HWCEC system 100 as an example, the hybrid PTO 300 can be relied upon as a mechanical transfer system in other systems and system configurations. In this example, the bi-directional motion of the first input shaft 302 is driven by a ball screw nut 204 translating on a ball screw 206. However, other mechanical means for translating linear relative motion to bi-directional rotation of the first input shaft 302 can also be relied upon, such as a rack and pinion, a pulley system, a chain system, and the like. Additionally, mechanical means for directly coupling bi-directional rotation to the first input shaft 302 can also be relied upon.

The HWCEC system 100 can operate with two separate inputs, where either or both of the first input shaft 302 from the WEC system 106 and the second input shaft 304 from the turbine 108 transfer torque to the output shaft 306, as shown in FIGS. 3A and 3B. Depending on the movement of the first input shaft 302 driven by the relative movement of the two-body WEC system 106, either the first one-way clutch 331 or the second one-way clutch 332 can be engaged. The third one-way clutch 333 can also engage to include the rotation of the second input shaft 304 driven by the turbine 108. As shown in FIG. 3A, when the first input shaft 302 turns counterclockwise, it transfers torque to the first one-way clutch 331 and then the output shaft 306. The second one-way clutch 332 is disengaged. In this case, the second input shaft 304 is turning at the same angular velocity as the first input shaft 302, so the third one-way clutch 333 is engaged. As shown in FIG. 3B, when the first input shaft 302 rotates clockwise, the first input shaft 302 first transfers torque to the bevel gear set 310 through engagement of the second one-way clutch 332 and then to the output shaft 306 while the first one-way clutch 331 is disengaged. In this case, the second input shaft 304 is turning at the same angular velocity as the first input shaft 302, so the third one-way clutch 333 is also engaged. In both cases, the third one-way clutch 333 and the second input shaft 304 are engaged and the output shaft 306 rotates in one direction regardless of which direction the first input shaft 302 rotates.

Although an example of a mechanical transfer system utilizes a bevel gear set, other motion coupling devices can be used to implement the coupling of the first and second input shafts to drive the output shaft and generator. For example, spur gears can also be used as a gear set. Further, other motion transmission components such as belts or chains can be used.

Thus, when the HWCEC system 100 operates with co-existing ocean wave and ocean current excitation, the output shaft 306 (and the generator 202) can be driven by current-input only, wave-input only, or by both sources simultaneously, which arrangement is chosen depends on the rotation speeds of the wave-input shaft 302 and the current-input shaft 304. The HWCEC system 100 has four working modes based on engagements and disengagements of the generator 202 with the input shafts 302, 304 including: WEC-engaged, turbine-engaged, both-engaged, and not-engaged.

In FIG. 4A-4D, shown are schematic and mathematical models of the four working modes of the HWCEC system 100. The four working modes include WEC-engaged (FIG. 4A), turbine-engaged (FIG. 4B), both-engaged (FIG. 4C), and not-engaged (FIG. 4D). The models are illustrated to show the dynamics of the two-body WEC system 106, for example. The input and output shafts mentioned below can be understood in the context of the WEC system 106, although the dynamics can apply to other systems similar to the WEC system 106.

Shown in FIG. 4A, the generator is not connected to the turbine, thus the relative motion of the WEC system is driving the output shaft and generator. In this WEC-engaged mode, the overall system has three independent degrees of freedom $z_1$, $z_2$, $\theta_c$, where $z_1$ is the displacement of the first body, $z_2$ is the displacement of the second body, and $\theta_c$ is the rotational displacement of the current-input shaft. In this mode, the rotation speed $\dot{\theta}_c$ of the current-input shaft is slower than the rotation speed $\dot{\theta}_{o,WEC}$ of the output shaft. Thus, the current-input shaft will be disengaged from the system and have independent degree of freedom. The clutch engagement and rotation of the first input shaft with respect to output shaft are shown in greater detail in in FIGS. 2A and 2B.

Shown in FIG. 4B, a generator is driven by the turbine only. In this turbine-engaged mode, the overall system has three degrees of freedom $z_1$, $z_2$, $\theta_c$. In this mode, the rotational speed $|\dot{\theta}_w|$ of wave-input shaft is slower than the rotation speed $\dot{\theta}_o$ of the output shaft. Thus, the wave-input shaft will be disengaged from the system. The turbine-input shaft is connected to the generator and has a relationship $\dot{\theta}_{o,turbine} = \dot{\theta}_c > |\dot{\theta}_w|$ and $\ddot{\theta}_{o,turbine} = \ddot{\theta}_c$, $\dot{\theta}_{o,turbine}$ and $\ddot{\theta}_{o,turbine}$ are the angular velocity and angular acceleration of output shaft when working in turbine-engaged mode. The clutch engagement and rotation of the second input shaft with respect to output shaft is shown in greater detail in in FIG. 2C.

Shown in FIG. 4C, both the forces of the turbine input and WEC input drive the generator. In this both-engaged mode, the overall system has two independent degrees of freedom $z_1$ and $z_2$ because the current-input shaft and output shaft are connected through bevel gears and thus have the same amplitude of angular velocity. Input from ocean current serves as an additional force term $F_c$ in the dynamic equation. The angular velocity of the shafts has the relationship $$\dot{\theta}_{o,both} = \dot{\theta}_c = |\dot{\theta}_w| = \frac{2\pi}{l_d}|\dot{z}_r|,$$

where $|\dot{\theta}_w|$ is the angular velocity of the first (i.e., ocean wave) input shaft, $\theta_c$ is the angular velocity of the second (i.e., ocean current) input shaft, and $\dot{\theta}_{o,both}$ is the angular velocity of output shaft in the both-engaged mode. Also, the angular acceleration of the output shaft 306 under both-engaged situation can be expressed as $$\ddot{\theta}_{o,both} = \text{sgn}(\dot{z}_r)\frac{2\pi}{l_d}(\ddot{z}_r).$$

$\dot{\theta}_{o,both}$ and $\ddot{\theta}_{o,both}$ are the angular velocity and angular acceleration of the output shaft working in both-engaged mode, respectively, where $z_r = z_1 - z_2$, $\dot{z}_r = \dot{z}_1 - \dot{z}_2$, $\ddot{z}_r = \ddot{z}_1 - \ddot{z}_2$ are the relative displacement, the relative velocity, and relative acceleration between the buoy and the submerged body.

In the period when the generator is engaged with neither the WEC nor the turbine, which is shown in FIG. 4D, the overall system has four independent degrees of freedom, including $z_1$, $z_2$, $\theta_c$ and $\theta_{o,n}$. $\dot{\theta}_{o,n}$ is the angular velocity of output shaft working in not-engaged mode. In this mode, the rotational speed of the three shafts have a relationship $\dot{\theta}_{o,n} > \dot{\theta}_c$ and $\dot{\theta}_{o,n} > |\dot{\theta}_w|$, where $|\dot{\theta}_w|$ is the angular velocity of the first (i.e., ocean wave) input shaft, $\theta_c$ is the angular velocity of the second (current) input shaft, and $\dot{\theta}_{o,n}$ is the angular velocity of the output shaft in the non-engaged mode. In the non-engaged mode, none of the clutches of the bevel gear set are engaged, thus neither the first nor second input shafts are driving the output shaft.

Figure 5A:
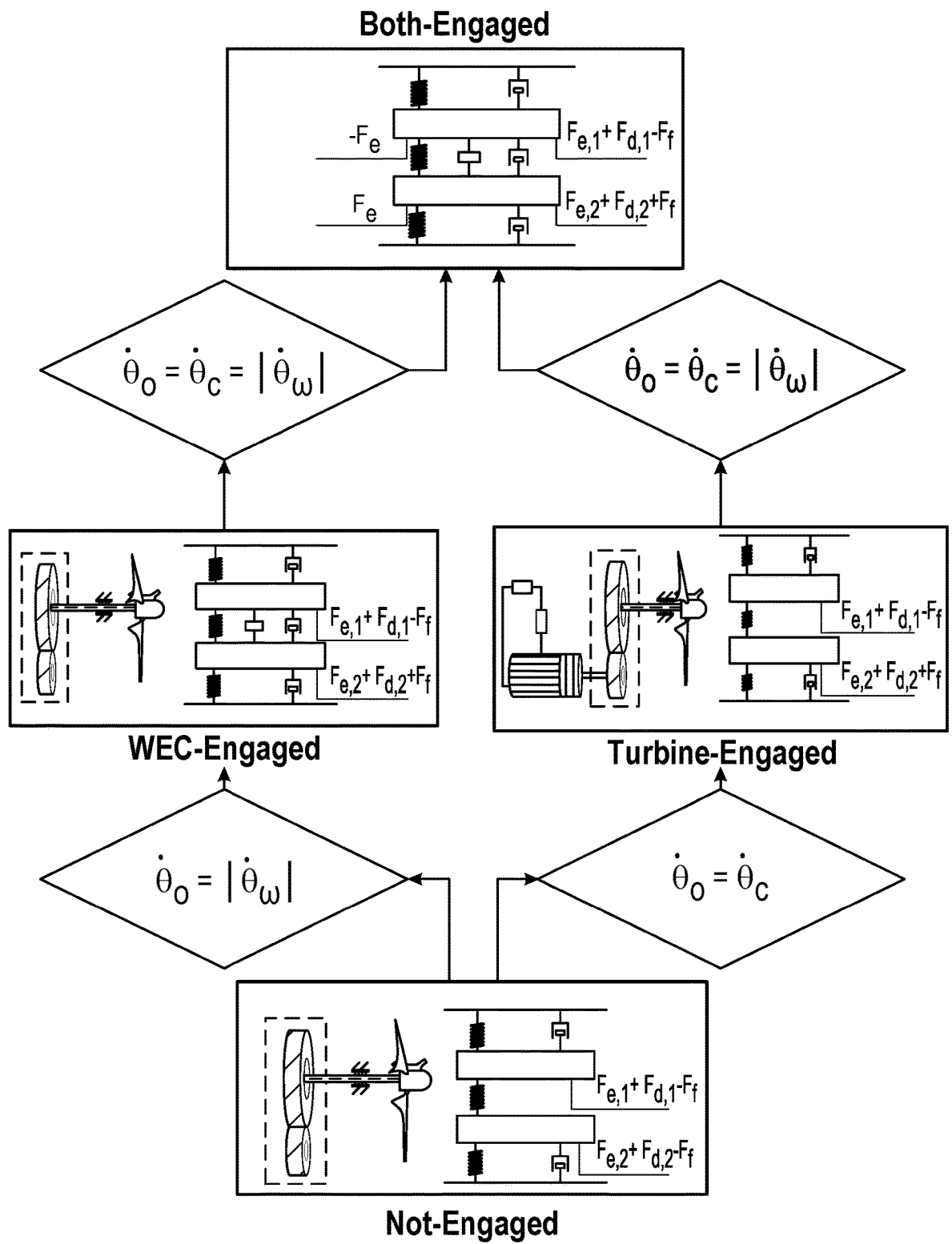
FIGS. 5A and 5B illustrate the logic frame and criteria of the HWCEC working mode switching according to various embodiments described herein.
Figure 5B:
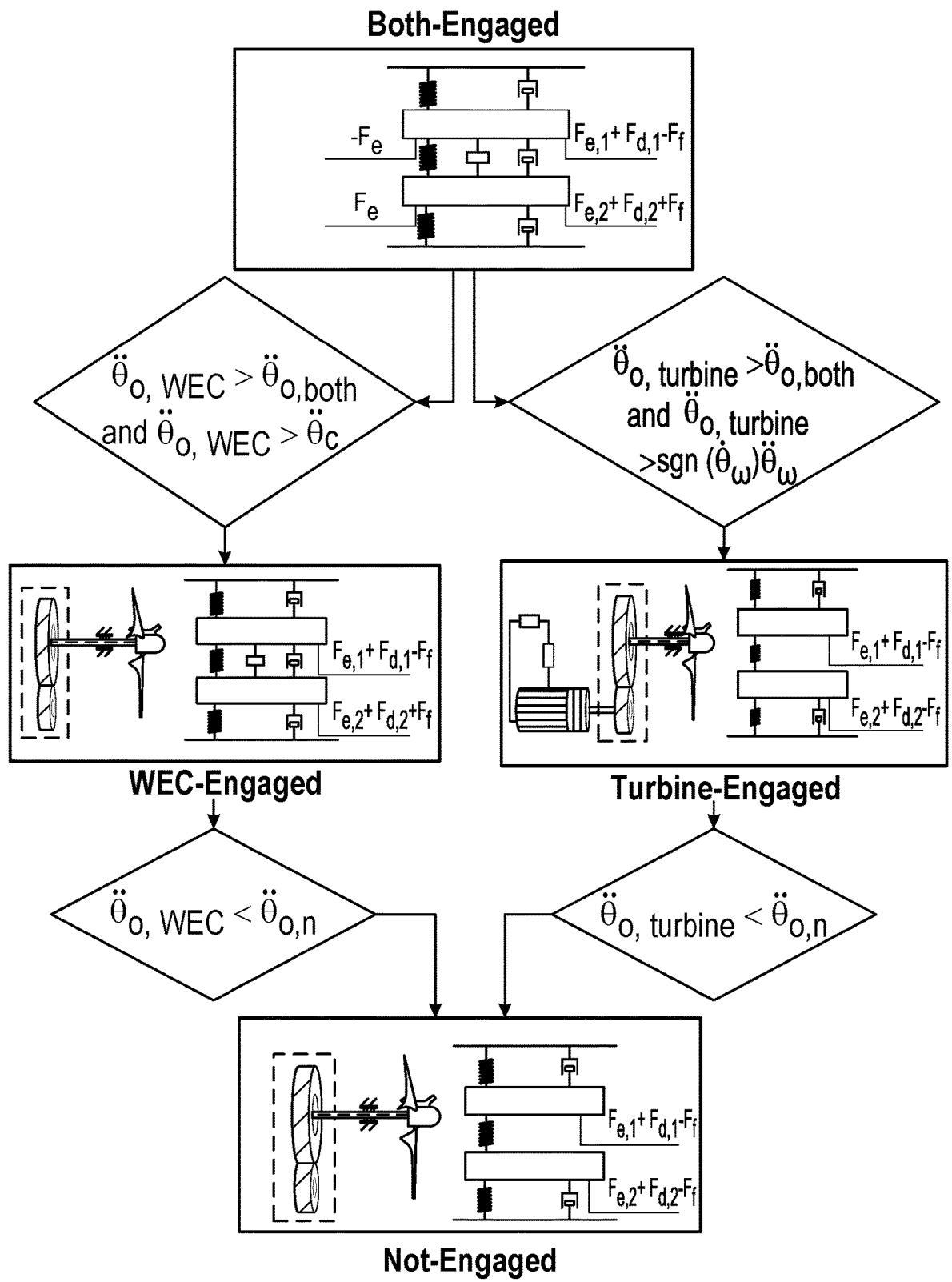

When such an HWCEC system is operated in an environment with co-existing ocean waves and ocean current, the overall system dynamics can be constructed by combining all the working modes mentioned above together with criteria for mode switching, as the logic frame shown in FIGS. 5A and 5B. Due to characteristic of the one-way clutch, input shafts will engage with the system and transfer torque to output shaft if the angular velocity of input shaft is the same or larger than that of the output shaft. When the rotational acceleration of the combined system is less than the rotational acceleration of the WEC or turbine working individually, disengagement occurs, leading to separate subsystems.

As shown in FIG. 5A, when the HWCEC system is working in not-engaged mode, the rotational speed of three shafts have a relationship $\dot{\theta}_{o,n} > \dot{\theta}_c$ and $\dot{\theta}_{o,n} |\dot{\theta}_w|$. In this case, if the rotational speed of wave-input shaft increases and reaches that of the output shaft, which is $\dot{\theta}_o = |\dot{\theta}_w|$, the HWCEC switches into WEC-engaged mode. In the WEC-engaged mode, if the rotational speed of current-input shaft increases and reaches that of output shaft and wave-input shat, which is $\dot{\theta}_c = |\dot{\theta}_w| = \dot{\theta}_o$, the HWCEC switches into both-engaged mode.

As shown in FIG. 5B, when in both-engaged mode, if the rotational acceleration of output shaft in WEC-engaged mode is higher than that in both-engaged mode and the rotational acceleration of current-input shaft, which is $\ddot{\theta}_{o,WEC} > \ddot{\theta}_{o,both}$ and $\ddot{\theta}_{o,WEC} > \ddot{\theta}_c$, the current-input shaft will disengage with system and HWCEC system will switch into WEC-engaged mode. In WEC-engaged mode, if $\ddot{\theta}_{o,WEC} < \ddot{\theta}_{o,n}$, the wave-input shaft will be disengaged and HWCEC will switch into not-engaged mode.

Additional details regarding the systems and methods of the present disclosure are provided in the examples below. The specific examples below are to be construed as merely illustrative, and not limitative of the remainder of the disclosure in any way whatsoever. Without further elaboration, it is believed that one skilled in the art can, based on the description herein, utilize the present disclosure to its fullest extent.

As a first example, for a HWCEC system with a fixed buoy diameter and turbine swept area, the working modes and performance is mainly decided by the ratio of power flux between ocean waves and current. For sites that the wave energy dominates over the current energy, the turbine-engaged mode and the both-engaged mode can hardly take place, and turbine will contribute little to the power output. For sites where the ocean current energy dominates, the point absorber will not engage with the PTO. In contrast, for the sites that rich in both wave and current energy, the HWCEC can have significant promotion in power comparing to WEC or turbine working individually. Time domain simulations were conducted. In a case study, the input regular wave has a 2.21 s wave period and 0.1 m wave height. Undisturbed fluid velocity is 0.5 m/s. The frictional forces $F_f$ and $T_f$ are neglected in the pre-test simulation. In the test, a motor is back driven and function as generator. PTO-related parameters are shown in Table 1.

TABLE 1

PTO-related parameters in the numerical simulation for HWCEC. Data are from Maxon motor #310007 motor (Maxon Group, Switzerland)

| Parameter | Value |
| --- | --- |
| Electric coefficient $k_e$ | 39.5 rpm/V |
| Torque coefficient $k_t$ | 0.242 Nm/A |
| Internal resistance $R_{in}$ | 3.9 Ohm |
| External resistance $R_{ex}$ | 4 Ohm |
| Screw lead $l_d$ | 0.04 m |

Figure 6:
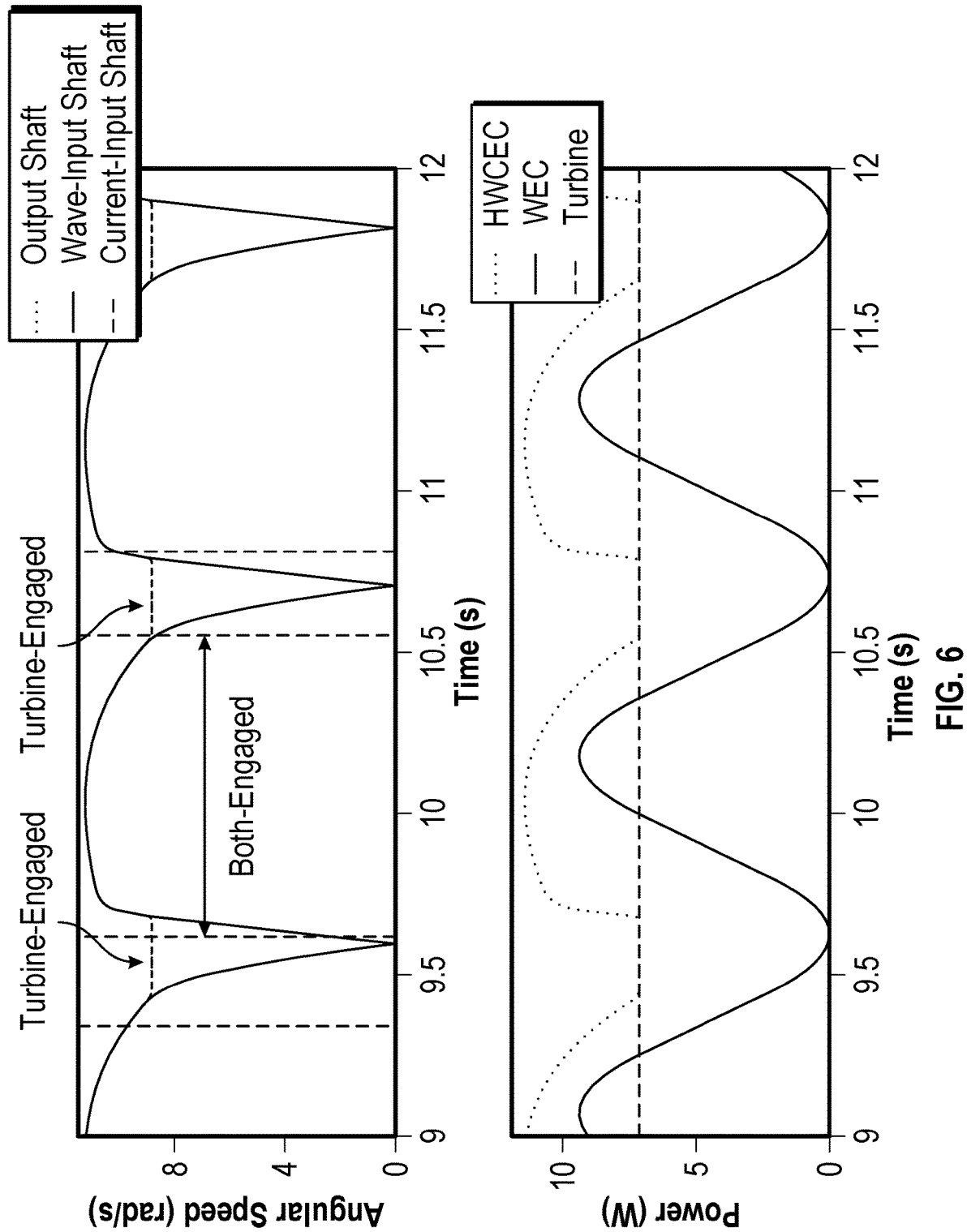
FIG. 6 illustrates a time-domain simulation result for an example HWCEC, WEC, and turbine according to one example described herein.

FIGS. 6A and 6B show time domain responses of an HWCEC system for three seconds under both wave and current excitation after system reaches steady state. The hybrid PTO rectifies the inverse motion of wave-input shaft and combined the rotational motion of current-input shaft into unidirectional rotation of output shaft. Different working status can be identified through the angular speed of input shafts and output shafts shown in FIG. 6A. The HWCEC system does not switch into not-engaged mode due to the co-existence of sufficient wave and current energy. FIG. 6B compares the power performance of the HWCEC system against that of the WEC and turbine working individually under the same wave and current conditions. In average, the HWCEC system has 9.4 W power output while WEC has 4.4 W and turbine has 7.0 W. The HWCEC has an average of 34% increase in electric power comparing to turbine acting in isolation.

As a second example, the prototype was tested at the BGO FIRST facility operated by the OCEANIDE. The basin is 16 m wide, 40 m long and can generate waves and current simultaneously. For all test phases, the water depth is 2 meters to ensure deep-water conditions. During the tests, the draft of the structure is set to be 1.5 m in calm water.

Figure 7:
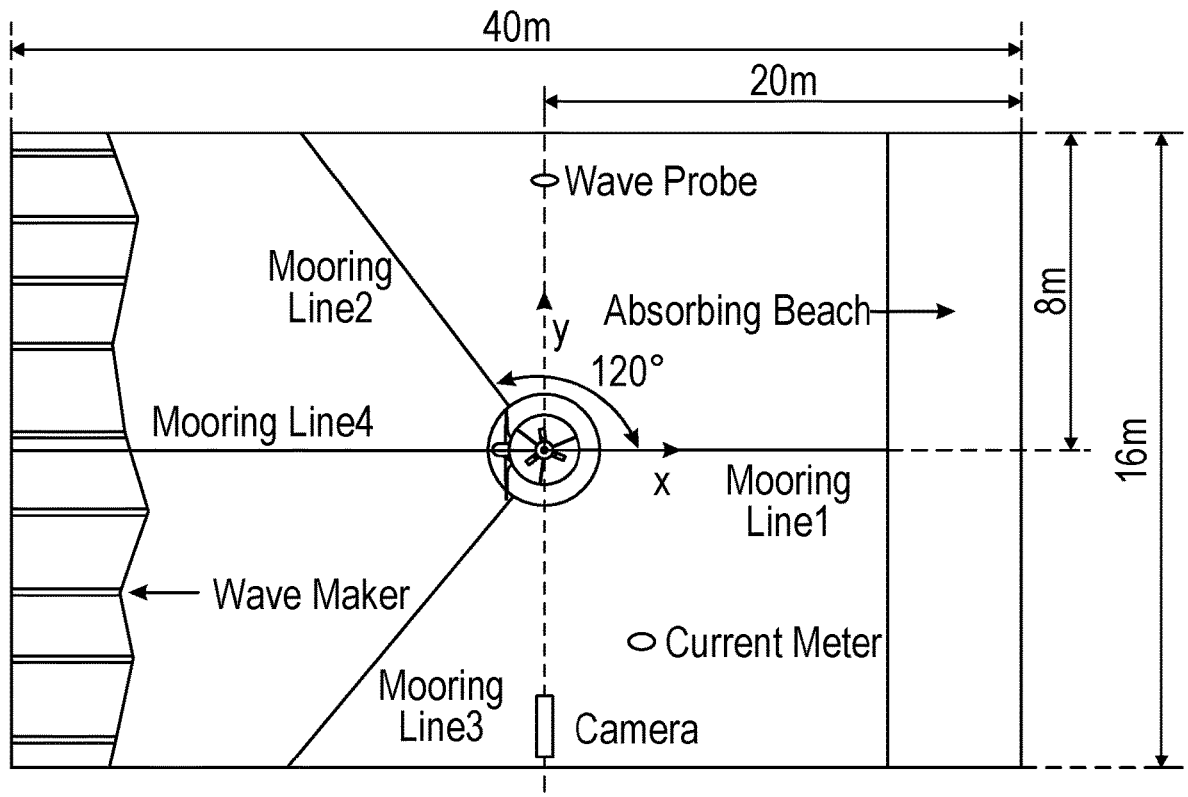
FIG. 7 illustrates an example layout of a tank and global cartesian reference frame according to another example described herein.

FIG. 7 shows the tank layout, global reference frame and general dimensions. Wave and current are set to travel along the global x-axis in a positive direction. Wave probe is placed at the same x coordinate as the tested structure for both wave calibration and recording time-domain wave height. Current velocity is calibrated and recorded with a current meter.

Figure 8:
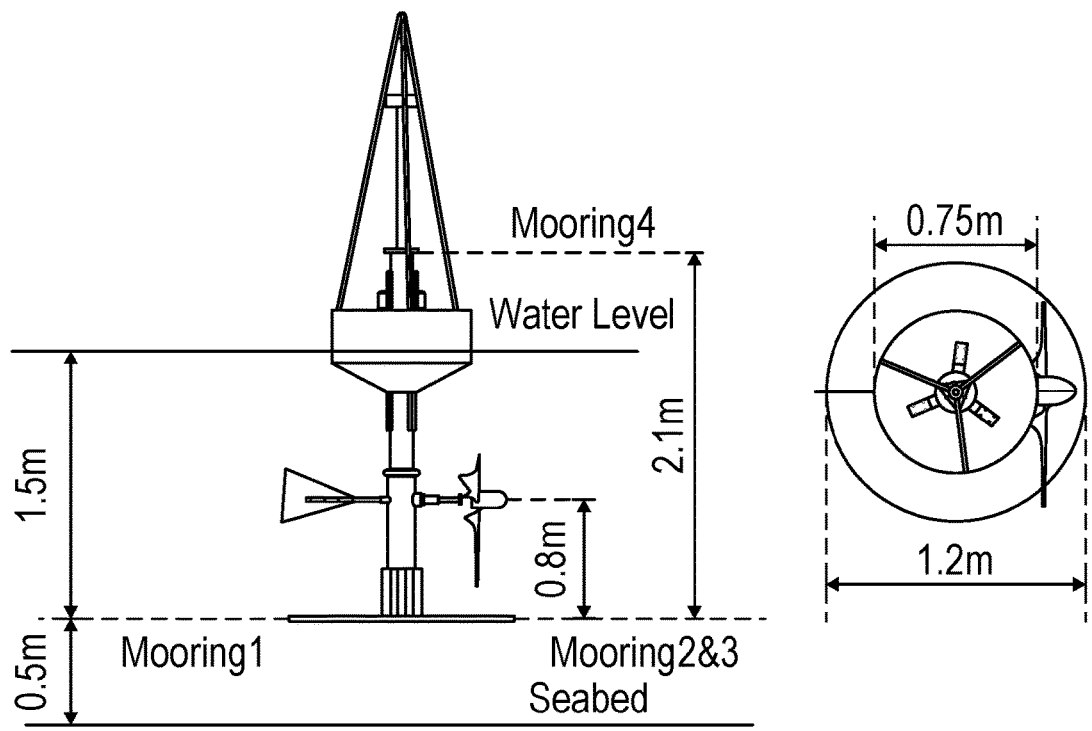
FIG. 8 illustrates an example layout of a test structure and relative dimensions according to another example described herein.

FIG. 8 shows the general dimension and layout of the scaled model in the test. A track-roller system constrains the relative motions in other directions between the buoy and the second body. Springs are placed between the two bodies to provide relative stiffness in heave.

One challenge for the model test of a HWCEC system is overcoming the inability to simultaneously maintain Froude number and Reynold number for a scaled wave-current test. The Froude number similitude is employed for HWCEC. Froude scaling have influence on turbine performance since change in Reynolds number results in changes in both lift and drag behavior for the turbine foil. The power coefficients of turbine in the model test is generally lower than the utility scale prototype. The tip speed ratios (TSR) of the turbine is maintained from prototype to model, which yields proper rotor torque in conjunction with a Froude scaling environment, assuming a low dependence on Reynolds number.

The mass, and inertia, and other properties of components of the test model are strictly required by the scaling law. The turbine blades are 3-D printed. The filling ratio and filling methodology is adjusted to control the mass and inertia property while maintaining geometric similarity. In the tank testing stage, extra features including balancing mass, floater, rudder, and the sensors were applied on the structure to make sure that the device is well balanced and faces the current direction. The physical properties of the scaled HWCEC model are given in Table 2.

TABLE 2

Breakdown of mechanical properties of the scaled HWCEC model

| Parameter | Value |
| --- | --- |
| Mass of buoy $m_1$ | 60.1 kg |
| Mass of second body $m_2$ | 110 kg |
| Hydro-stiffness of buoy $K_{h,1}$ | 4338 N/m |
| Hydro-stiffness of second body $k_{h,2}$ | 120 N/m |
| Spring stiffness $k_s$ | 500 N/m |
| Turbine moment of inertia $J_t$ | $2.9 \times 10^{-2}$ kgm$^2$ |
| Current-input shaft moment of inertia $J_c$ | $1.1 \times 10^{-3}$ kgm$^2$ |
| Ball screw inertia $J_{bs}$ | $4.95 \times 10^{-5}$ kgm$^2$ |

Figure 9:
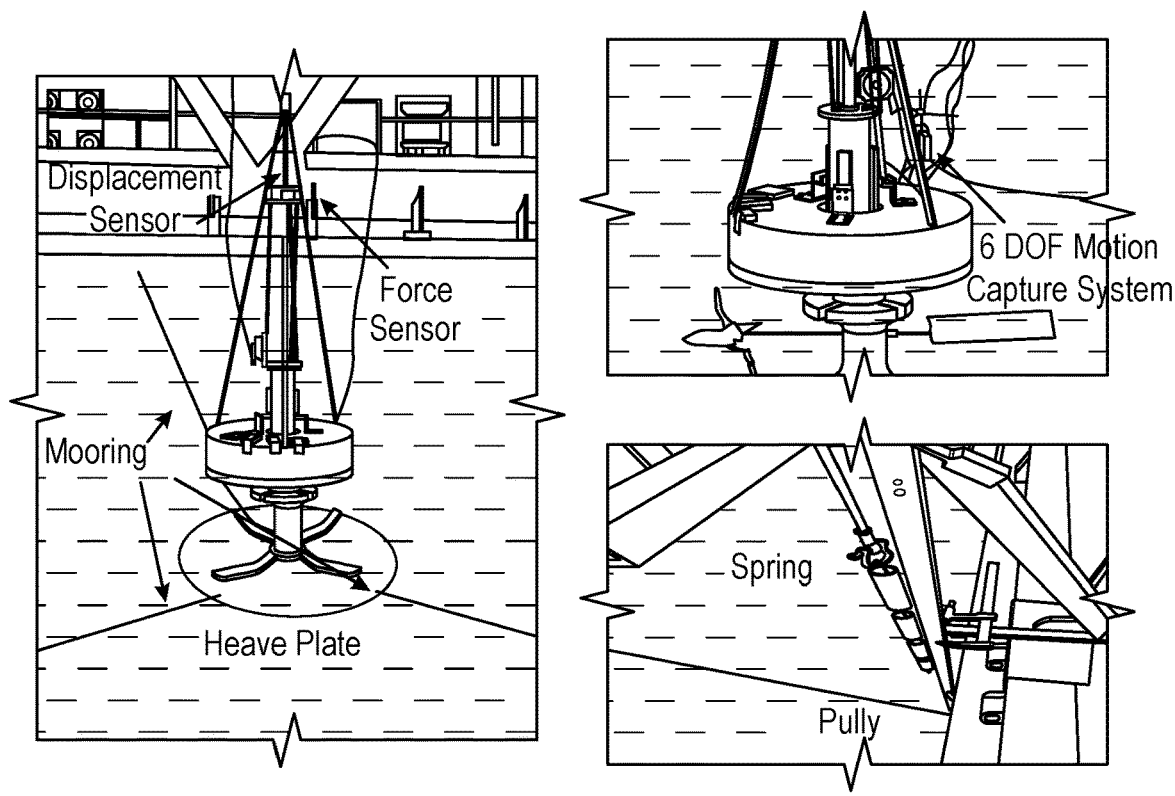
FIG. 9 illustrates an example arrangement of a mooring and sensors, with mooring lines kept horizontal to the free surface by using pullies, according to an example described herein.

The structure uses four mooring lines. Among them, three mooring lines were installed on the bottom of the second body and attached to the heave plate. The mooring lines were kept horizontal using pully and were kept at 1.5 m depth from free water surface to both restrict the surge and sway motion of the system and reduce influence on heave motion of the system. As shown in FIG. 9, springs with constant stiffness are connected to one end of the mooring lines. The condition of resonance in surging direction decrease the stability of the system and lead to potential damages. The stiffness of the moorings is chosen as 150 N/m such that structure has natural angular frequency in surging direction of the system out of the range of the wave angular frequencies tested. Important data including PTO forces, voltage on the external resistive loads, displacement of buoy and second body are recorded.

Power generated from the WEC can drop to zero based on the relative velocity between the two bodies. For the HWCEC, due to the existence of current energy, the output energy will not reduce to zero. This increases output power and reduces the power peak-to-average ratio. The power output of turbine is 2.04 W. Performance of the HWCEC and WEC are compared for all the regular wave conditions tested. Results are shown in Table 3.

TABLE 3

Comparison on power generated for the WEC, the turbine, and the HWCEC

| Current Velocity [m/s] | Wave (Peak) Period [s] | (Sig.) Wave Height [m] | Max. Power, WEC [W] | Max. Power, HWCEC [W] |
| --- | --- | --- | --- | --- |
| 0.6 | 1.57 | 0.048 | 1.12 | 2.53 |
| 0.6 | 1.79 | 0.063 | 1.928 | 3.857 |
| 0.6 | 1.9 | 0.07 | 0.92 | 3.09 |
| 0.6 | 2.21 | 0.096 | 2.78 | 4.21 |
| 0.6 | 2.53 | 0.125 | 3.76 | 4.74 |

As for the cases tested, maximum output electric power (regarding to the external resistive loads) of the hybrid energy converter was then compared to that of point absorber and turbine. Results show that the HWCEC has a range of 29-87% power promotion. Comparison is also conducted for irregular (polychromatic) waves. Time domain data are shown for cases under waves that have 3.06 s significant wave period and 0.12 m significant wave height and 0.6 m/s ambient current velocity.

Figure 10:
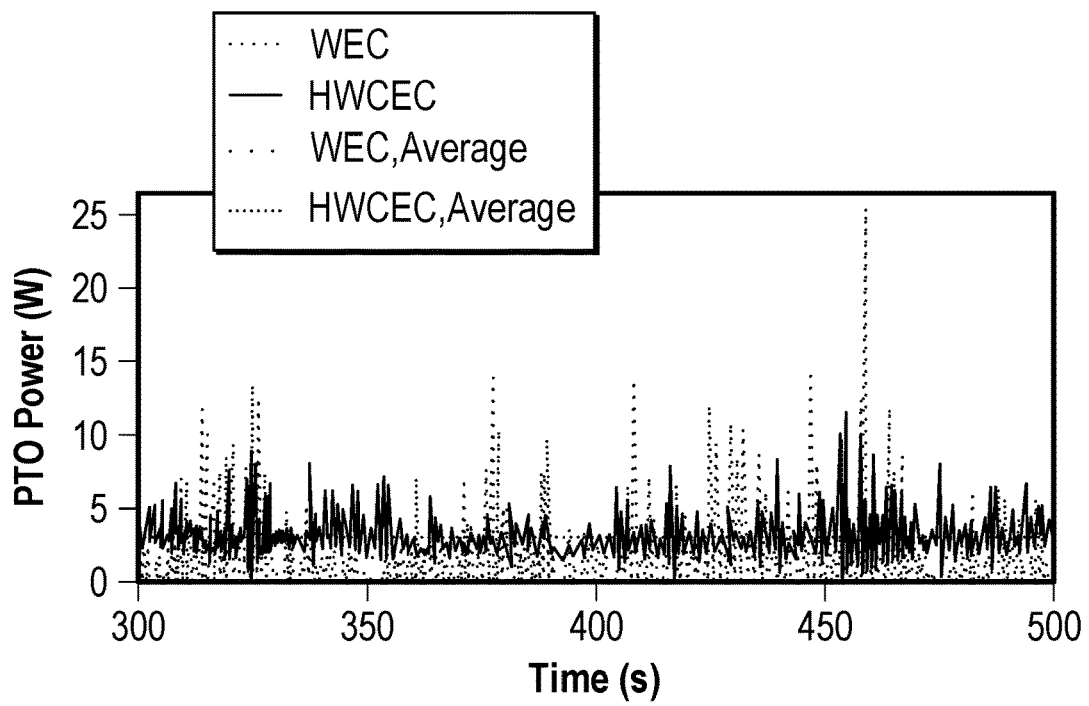
FIG. 10 illustrates an example power output under sea environment constructed according to an example described herein.

FIG. 10 shows 200 seconds of time-domain power result of WEC and HWCEC. In a traditional two-body WEC, the output power drops to zero when the relative velocity of the two bodies becomes zero. In HWCEC, however, the current input shaft will engage with the generator and generate power when the WEC has a low velocity. In this way, HWCEC generates more power than WEC or turbine working individually. As for the simulations conducted, HWCEC has average power of 2.92 W while the two-body WEC system yields 1.63 W. Furthermore, the existence of turbine decreased the power peak-to-average value. For the cases simulated, the power peak-to-average value for WEC is 15 while for the HWCEC it is only 4, indicating a 70 percent reduction. Therefore, the operation and maintenance cost, and thus LCOE, for HWCEC are expected to be lower than for a traditional WEC.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

The disclosure is not limited to the particular embodiments described above. Unless defined otherwise, all technical and scientific terms used herein have the same meaning as commonly understood by one of ordinary skill in the art to which this disclosure belongs. Other methods and materials similar or equivalent to those described herein can also be used in the practice or testing of the present disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The examples are put forth to provide those of ordinary skill in the art with a complete disclosure and description of how to construct and use the systems and methods disclosed and claimed herein. It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

The invention claimed is:

1. A hybrid energy converter, comprising:
a wave energy converter comprising a body or buoy, the wave energy converter configured to convert linear motion of the body or buoy along an axial length of a first input shaft to a bi-directional rotation of the first input shaft, the linear motion produced by an oscillatory motion of waves on the body or buoy;
a turbine configured to turn a second input shaft; and
a hybrid power takeoff comprising a mechanical transfer system configured to mechanically couple the first input shaft, the second input shaft, an output shaft, and a generator, the generator being coupled to the output shaft.

2. The hybrid energy converter of claim 1, wherein the mechanical transfer system comprises a motion coupling device, the motion coupling device comprising at least one motion transmission component and at least one one-way clutch, the at least one one-way clutch being positioned to engage the motion coupling device and transfer torque to the output shaft from at least one of the first input shaft and the second input shaft.

3. The hybrid energy converter of claim 2, wherein the at least one motion transmission component comprises at least one of: a bevel gear, a spur gear, a belt, or a chain.

4. The hybrid energy converter of claim 2, wherein:
the at least one one-way clutch comprises three one-way clutches;
a first clutch among the three one-way clutches is configured to engage the first input shaft for clockwise rotation of the first input shaft and to release the first input shaft for counterclockwise rotation of the first input shaft;
a second clutch among the three one-way clutches is configured to release the first input shaft for clockwise rotation of the first input shaft and to engage the first input shaft for counterclockwise rotation of the first input shaft; and
a third clutch among the three one-way clutches is configured to engage the second input shaft for clockwise rotation of the second input shaft and to release the second input shaft for counterclockwise rotation of the second input shaft.

5. The hybrid energy converter of claim 2, wherein:
the at least one one-way clutch comprises three one-way clutches;
a first clutch among the three one-way clutches is configured to engage the first input shaft for counterclockwise rotation of the first input shaft and to release the first input shaft for clockwise rotation of the first input shaft;
a second clutch among the three one-way clutches is configured to release the first input shaft for counterclockwise rotation of the first input shaft and to engage the first input shaft for clockwise rotation of the first input shaft; and
a third clutch among the three one-way clutches is configured to engage the second input shaft for counterclockwise rotation of the second input shaft and to release the second input shaft for clockwise rotation of the second input shaft.

6. The hybrid energy converter of claim 2, wherein the output shaft is mechanically secured in a first axial channel of the hybrid power takeoff, and the output shaft rotates in one direction.

7. The hybrid energy converter of claim 2, wherein the at least one one-way clutch is configured to engage when an angular velocity of the output shaft is less than a rotational velocity of at least one of the first input shaft and the second input shaft.

8. The hybrid energy converter of claim 1, wherein:
the output shaft is driven by the first input shaft when an angular velocity of the first input shaft is greater than an angular velocity of the second input shaft and the output shaft;
the output shaft is driven by the second input shaft when the angular velocity of the second input shaft is greater than the angular velocity of the first input shaft and the output shaft; and
the output shaft is driven by both the first input shaft and the second input shaft when the angular velocity of the first input shaft is equal to the angular velocity of the second input shaft and greater than the angular velocity of the output shaft.

9. The hybrid energy converter of claim 1, wherein in response to an angular acceleration of the first input shaft being greater than an angular acceleration of the second input shaft or the output shaft, the first input shaft is engaged to drive the output shaft.

10. The hybrid energy converter of claim 1, wherein in response to an angular acceleration of the second input shaft being greater than an angular acceleration of the first input shaft or the output shaft, the second input shaft is engaged to drive the output shaft.

11. A hybrid ocean energy converter, comprising:
a two-body point absorber comprising a first body and a second body, the first body configured for linear relative motion along an axial length of the second body, the two-body point absorber configured to transfer the linear relative motion between the first body and the second body to bi-directional rotation of a first input shaft;

a turbine configured to turn a second input shaft; and a hybrid power takeoff comprising a mechanical transfer system configured to mechanically couple the first input shaft, the second input shaft, an output shaft, and a generator, the generator being coupled to the output shaft.

12. The hybrid ocean energy converter of claim 11, wherein the mechanical transfer system comprises a bevel gear set, the bevel gear set comprising three bevel gears, and three one-way clutches, the three one-way clutches being positioned to engage the bevel gear set to transfer torque to the output shaft from at least one of the first input shaft and the second input shaft.

13. The hybrid ocean energy converter of claim 12, wherein:
   a first clutch among the three one-way clutches is configured to engage the first input shaft for clockwise rotation of the first input shaft and to release the first input shaft for counterclockwise rotation of the first input shaft;
   a second clutch among the three one-way clutches is configured to release the first input shaft for clockwise rotation of the first input shaft and to engage the first input shaft for counterclockwise rotation of the first input shaft; and
   a third clutch among the three one-way clutches is configured to engage the second input shaft for clockwise rotation of the second input shaft and to release the second input shaft for counterclockwise rotation of the second input shaft.

14. The hybrid ocean energy converter of claim 12, wherein the output shaft is mechanically secured in a first axial channel of the hybrid power takeoff, and the output shaft rotates in one direction.

15. The hybrid ocean energy converter of claim 12, wherein at least one one-way clutch among the three one-way clutches is configured to engage when an angular velocity of the output shaft is less than a rotational velocity of at least one of the first input shaft and the second input shaft.

16. The hybrid ocean energy converter of claim 11, wherein:
   the output shaft is driven by the first input shaft when an angular velocity of the first input shaft is greater than an angular velocity of the second input shaft and the output shaft;
   the output shaft is driven by the second input shaft when the angular velocity of the second input shaft is greater than the angular velocity of the first input shaft and the output shaft; and
   the output shaft is driven by both the first input shaft and the second input shaft when the angular velocity of the first input shaft is equal to the angular velocity of the second input shaft and greater than the angular velocity of the output shaft.

17. The hybrid ocean energy converter of claim 11, wherein in response to an angular acceleration of the first input shaft being greater than an angular acceleration of the second input shaft or the output shaft, the first input shaft is engaged to drive the output shaft.

18. The hybrid ocean energy converter of claim 11, wherein in response to an angular acceleration of the second input shaft being greater than an angular acceleration of the first input shaft or the output shaft, the second input shaft is engaged to drive the output shaft.

19. The hybrid ocean energy converter of claim 11, wherein the first body floats on a surface of a body of water, the second body submerges in water, and the first body and the second body translate relative to each other in response to oscillating wave motion.

20. The hybrid ocean energy converter of claim 11, further comprising a turbine gearbox connected between a turbine shaft and the second input shaft, the turbine gearbox comprising a planetary gear system configured to convert a first rotational velocity of the turbine shaft to a second rotational velocity of the second input shaft.

21. A hybrid ocean energy converter, comprising:
   a two-body point absorber comprising a first body and a second body, the two-body point absorber configured to transfer a linear relative motion between the first body and the second body to bi-directional rotation of a first input shaft, wherein the first body comprises a floating buoy, and the second body comprises a submerged plate;
   a turbine configured to turn a second input shaft; and
   a hybrid power takeoff comprising a mechanical transfer system configured to mechanically couple the first input shaft, the second input shaft, an output shaft, and a generator, the generator being coupled to the output shaft, and the hybrid power takeoff further comprises a ball screw nut and a ball screw, the floating buoy connected to the ball screw nut, the ball screw connected to the submerged plate, the ball screw nut configured to translate along the ball screw to rotate the first input shaft, the ball screw connected to the first input shaft.

* * * * *